United States Patent [19]
Cato et al.

[11] Patent Number: 5,442,343
[45] Date of Patent: Aug. 15, 1995

[54] ULTRASONIC SHELF LABEL METHOD AND APPARATUS

[75] Inventors: Robert T. Cato; Richard H. Harris, both of Raleigh, N.C.

[73] Assignee: International Business Machines Corporation, Armonk, N.Y.

[21] Appl. No.: 80,340

[22] Filed: Jun. 21, 1993

[51] Int. Cl.⁶ .............................................. G06F 7/04
[52] U.S. Cl. ........................ 340/825.35; 340/825.54; 340/825.17
[58] Field of Search ...................... 340/825.35, 825.17, 340/825.54, 825.32; 367/197; 235/383; 364/464.01

[56] References Cited

U.S. PATENT DOCUMENTS

| | | | |
|---|---|---|---|
| 4,002,886 | 1/1977 | Sundelin | 235/61.7 R |
| 4,139,149 | 2/1979 | Crepeau et al. | 235/383 |
| 4,213,199 | 7/1980 | Labaw et al. | 367/117 |
| 4,322,611 | 3/1982 | Edelman | 235/383 |
| 4,415,065 | 11/1983 | Sandstedt | 340/825.35 X |
| 4,500,880 | 2/1985 | Gomersall et al. | 340/825.35 |
| 4,673,932 | 6/1987 | Ekchian et al. | 340/825.54 |
| 4,677,777 | 7/1987 | Hoffman et al. | 40/460 |
| 4,766,295 | 8/1988 | Davis et al. | 235/383 |
| 4,821,291 | 3/1989 | Stevens et al. | 375/37 |
| 4,879,756 | 11/1989 | Stevens et al. | 455/39 |
| 4,888,709 | 12/1989 | Revesz et al. | 364/518 |
| 4,924,564 | 5/1990 | Shah | 367/197 |
| 4,937,586 | 6/1990 | Stevens et al. | 343/702 |
| 4,955,000 | 9/1990 | Nastrom | 367/117 |
| 4,962,466 | 10/1990 | Revesz et al. | 364/518 |
| 4,973,952 | 11/1990 | Malec et al. | 340/825.35 |
| 5,019,811 | 5/1991 | Olsson et al. | 340/825.17 |
| 5,111,196 | 5/1992 | Hunt | 340/825.35 |
| 5,158,310 | 10/1992 | Tannehill et al. | 340/825.32 |
| 5,198,644 | 3/1993 | Pfeiffer et al. | 235/383 |

FOREIGN PATENT DOCUMENTS 2604315 3/1988 France .

Primary Examiner—Donald J. Yusko
Assistant Examiner—Edwin C. Holloway, III
Attorney, Agent, or Firm—A. P. Tennent

[57] ABSTRACT

An apparatus and method for ultrasonically communicating information from a source to a destination and for acknowledging receipt of that information by the destination. The apparatus includes at least one processor, at least one transceiver, and at least one display device, each display device having a unique identifier. The processor communicates information for broadcast to the transceiver. The processor also performs digital signal processing for detecting an acknowledgement signal within a narrow bandwidth. The transceiver ultrasonically broadcasts an identifier and associated data to display devices within the broadcast area, and also receives ultrasonic signals. A display device includes a transducer, a comparator, a memory, a display panel, and logic. In the communication method, a processor, a transceivers, and a display device communicate by initially associating data with a unique display device identifier. The processor communicates the identifier/data pair to the transceiver, which in turn ultrasonically broadcasts the identifier and associated data to display devices within the broadcast range. If the received identifier matches the unique identifier of the display device, then an acknowledgement signal is generated and the data is displayed at the display device. The processor determines whether the acknowledgement signal was generated within a defined bandwidth by performing digital signal processing.

20 Claims, 5 Drawing Sheets

ULTRASONIC SHELF LABEL METHOD AND APPARATUS

BACKGROUND OF THE INVENTION

1. Field of the Invention

The present invention relates to an apparatus and method for ultrasonic communication. More particularly, the present invention relates to an apparatus and method for ultrasonically communicating data from a source to a destination, ultrasonically acknowledging receipt of the data, and displaying the data at the destination. A particular application of the invention is to ultrasonically communicate price information from a computer to a remote display device, such as an electronic shelf label, ultrasonically acknowledge receipt of the information by the display device, and display the food price information on the display device. A novel application of digital signal processing enables the acknowledgement transmission to not consume much power.

2. Description of Related Art

Technology is becoming more and more prevalent in retail consumer transactions. At checkout stations, for example, automatic detection of price information on bar coded items is now commonplace. A more recent advance is the use of electronic shelf edge labels to display food item and/or price information for shelved items. In this way, pricing information for the shelved items may be electronically updated rather than manually updating printed shelf labels.

Electronic shelf edge labels available today typically require manual entry of data or remote entry via radio, light, or direct-connect communication. U.S. Pat. No. 5,019,811, assigned to Unigrafic AG, for example, discusses the use of a radio connection or an infrared connection between a computer or control device and an electronic shelf label. U.S. Pat. No. 4,002,886, issued to R. M. Sundelin, relates primarily to a direct-connect system for communicating price information from a computer to an electronic price display unit.

Unfortunately, a radio link is expensive and therefore the number of radio transceivers per shelf or gondola is typically limited to one. Individual shelf edge labels are then physically connected by wires or snap-in tracks to the radio transceiver, negating the ability to directly communicate with individual labels. Furthermore, radio links are increasing to the point that channels are beginning to interfere with each other. This interference threatens the reliability of existing and future radio links.

Direct communication with individual labels is illustrated by the light-based ILID system by Technical Computing & Graphics (TCG) Systems Automation Marketing. The ILID system communicates with individual labels by flickering florescent lights in the store. Communication is one-way only, however. Labels do not transmit information.

In general, existing systems suffer from a number of disadvantages sought to be addressed by the present invention. By way of example, some existing systems do not provide for two-way communication. Labels cannot acknowledge receipt of data. Also, light based systems are disadvantageous because of the distraction inherent in flickering lights and because shadows render some labels inactive. Another disadvantage of some current systems is that they require line-of-sight communication between the source and destination (such as antennas or wiring to gondolas).

SUMMARY OF THE INVENTION

The present invention overcomes the disadvantages and limitations of the related art by providing an apparatus and method for ultrasonically communicating information from a source to a destination and for acknowledging receipt of that information by the destination.

The apparatus comprising the system includes at least one processor, at least one transceiver, and at least one display device. The processor communicates information to the transceiver and either includes or has access to a database for storing display device identifiers and associated data to be displayed at the identified display devices. The processor also performs digital signal processing for detecting an acknowledgement signal. The transceiver ultrasonically broadcasts an identifier and associated data to display devices within the broadcast area, and also receives ultrasonic signals. Each display device has a unique identifier associated with it. A display device includes a transducer for receiving and generating ultrasonic signals, a comparator for determining whether a received broadcast identifier matches the unique identifier of the display device, a memory, and a display panel, such as a liquid crystal display (LCD) panel, for displaying data. The transceiver may also include cyclic redundancy checking (CRC) means.

In the method for communicating between a processor, a transceiver, and a display device, data is initially associated with a unique display device identifier. The processor communicates the identifier/data pair to the transceiver, which in turn ultrasonically broadcasts the identifier and associated data to display devices within the broadcast area. Each display device receives at least the broadcast identifier. If the received identifier matches the unique identifier of the display device, then an acknowledgement signal is generated and the data is displayed at the display device. The transceiver receives ultrasonic signals for defined time frames both before and after it broadcasts information to display devices. The before-and-after ultrasonic signal information is communicated to the processor for digital signal processing and a determination of whether the acknowledgement signal was generated.

An advantage of the invention is to provide an apparatus and method for communicating information from a source to a destination and for acknowledging receipt of that information by the destination.

Another advantage of the invention is to provide an apparatus and method for communicating information that is unique and unaffected by existing communication links.

Another advantage of the invention is to provide an apparatus and method for communicating an acknowledgement signal from the destination to the source with very little power consumption.

Another advantage of the invention is to provide an apparatus and method for communicating information from a source to a destination which does not require flickering of a light source, such as florescent lights.

Another advantage of the invention is to provide an apparatus and method for ultrasonically communicating information from a source to a destination which does not require line-of-sight communication between the source and the destination.

Another advantage of the invention is to provide an apparatus and method for ultrasonically communicating information from a source to a destination which may be integrated into a pre-existing sound system.

Yet another advantage of the invention is to provide an apparatus and method for ultrasonically communicating information from a source to a destination wherein the destination device may be solar/light powered.

The foregoing and other objects and advantages of the present invention will be apparent to those skilled in the art of ultrasonic communication in view of the accompanying drawings, description of the invention, and appended claims.

DESCRIPTION OF THE PREFERRED EMBODIMENT

Figure 1:
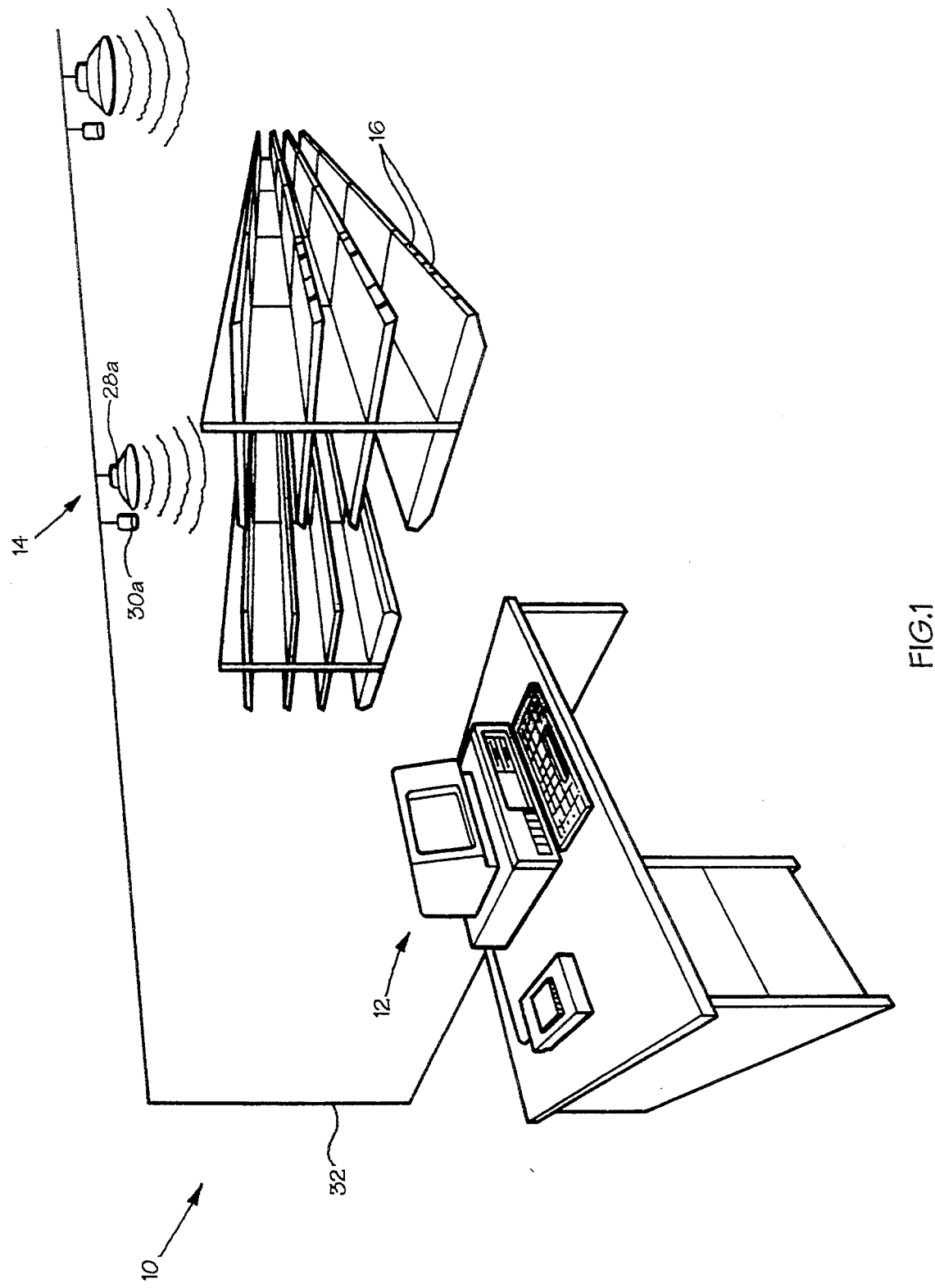
FIG. 1 is a perspective view depicting an embodiment of the invented ultrasonic communication system.

Referring now to FIG. 1, an ultrasonic communication system 10 is shown which includes means 12 for processing data (hereafter "processor"), means 14 for transceiving ultrasonic signals (hereafter "transceiver"), and means 16 for displaying data (hereafter "display device"). A typical system 10 will employ a processor 12, multiple transceivers 14, and multiple display devices 16 for each transceiver 14. For ease of discussion, however, the following description discusses the relationship between a processor 12, a transceiver 14, and a display device 16.

Figure 2:
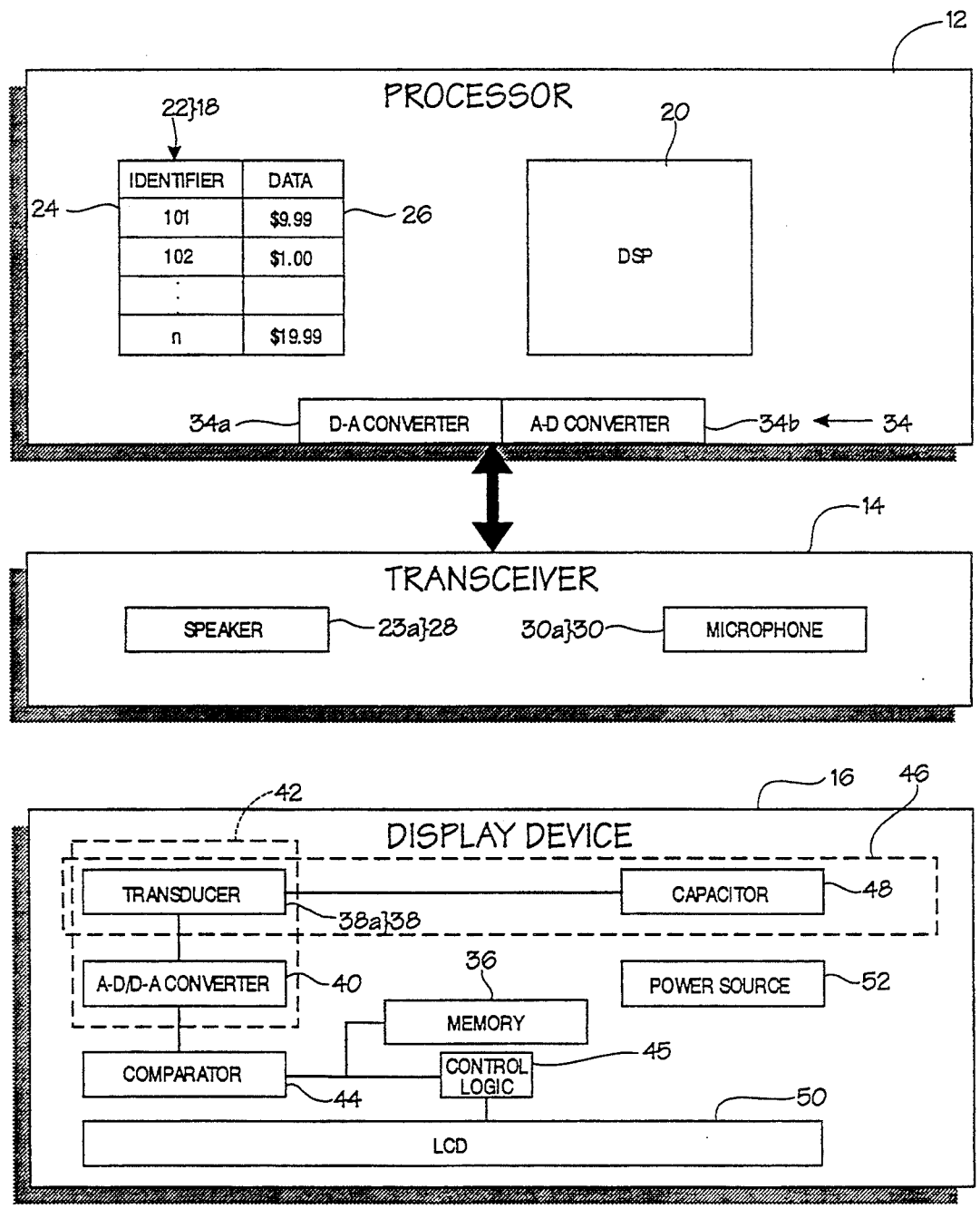
FIG. 2 is a block diagram depicting components of an embodiment of the invented ultrasonic communication system.

The processor 12 is a computer, such as an IBM ® Personal System/2 ® (PS/2 ®) computer. For purposes herein, "computer" includes a device capable of performing the functions of a Turing Machine. A Turing Machine is a well-known computer science concept and is explained in Encyclopedia of Computer Science, Ed. Anthony Ralston, ISBN 0-88405-321-0, which is specifically incorporated herein by reference. As shown in FIG. 2, the processor 12 includes means 18 for associating data with an identifier and means 20 for detecting an acknowledgement (ACK) signal.

The preferred associating means 18 for the processor 12 is a database 22 comprising a set of identifier/data pairs. Each identifier (ID) 24 identifies a particular display device 16. The data 26 paired with a particular identifier 24 is the data intended to be displayed. by the display device 16. Thus, if the data $9.99 were intended to be displayed at the display device identified by the identifier 101, the paired entry <101, $9.99>, for example, would be included in the database. The database 22 may be created and maintained using any one of a number of commercially available database computer programs, or by appropriately organizing the entries in a computer data file, such as a text file or binary file.

The preferred acknowledgment signal detecting means 20 for the processor 12 is a computer program for performing digital signal processing (DSP) on digitized data received by the transceiver 14. Alternatively, if the particular application required fast DSP, the DSP could be performed by a DSP hardware device, such as the TMS320C40 by Texas Instruments. DSP techniques are explained in "Theory & Application of Digital Signal Processing" by Lawrence R. Rabiner and Bernard Gold, ISBN 0-13-914101-4, which is specifically incorporated herein by reference.

The transceiver 14 is a terminal that can transmit and receive traffic, including, but not limited to, acoustic (sonic and ultrasonic) traffic. The transceiver 14 includes means 28 for ultrasonically broadcasting the identifier and the associated data, such as an acoustic speaker device 18a, and also includes means 30 for receiving ultrasonic signals, such as a microphone 30a. The transmitter component 28 of the transceiver 14 preferably includes a piezoelectric transducer 28b for converting electrical signals into mechanical vibrations. Conversely, the receiver component 30 of the transceiver 14 also preferably includes a piezoelectric transducer 30b for converting vibrations into electrical signals. The transmitter 28 and the receiver 30 may comprise a single unit. The processor 12 and the transceiver 14 are effectively coupled to one another for communication between the two units. The preferred embodiment is to directly connect (e.g., through wiring 32) the processor 12 and the transceiver 14 via an analog-to-digital (A-D)/digital-to-analog (D-A) converter interface 34. Alternatively, other forms of wire and/or wireless communication may be employed, including acoustic, radio frequency, or sight-based communication. The processor 12 communicates identifier/data pairs 24, 26 to the transceiver 14 for broadcast, employing the D-A converter 34a to convert the identifier/data pairs from digital form to analog form. The transceiver 14 communicates ultrasonic signals to the processor 12 for DSP, employing the A-D converter 34b to convert the ultrasonic signals from analog form to digital form.

In one embodiment, a conventional public address (PA) system may be adapted for use in accordance with the present invention. The processor 12 and the A-D/D-A converter interface 34 would serve as the PA base station and amplifier. The transceivers 14 would replace the PA speakers, but would be capable of generating sonic and ultrasonic sound. Existing PA wiring would not need to be replaced.

Figure 3:
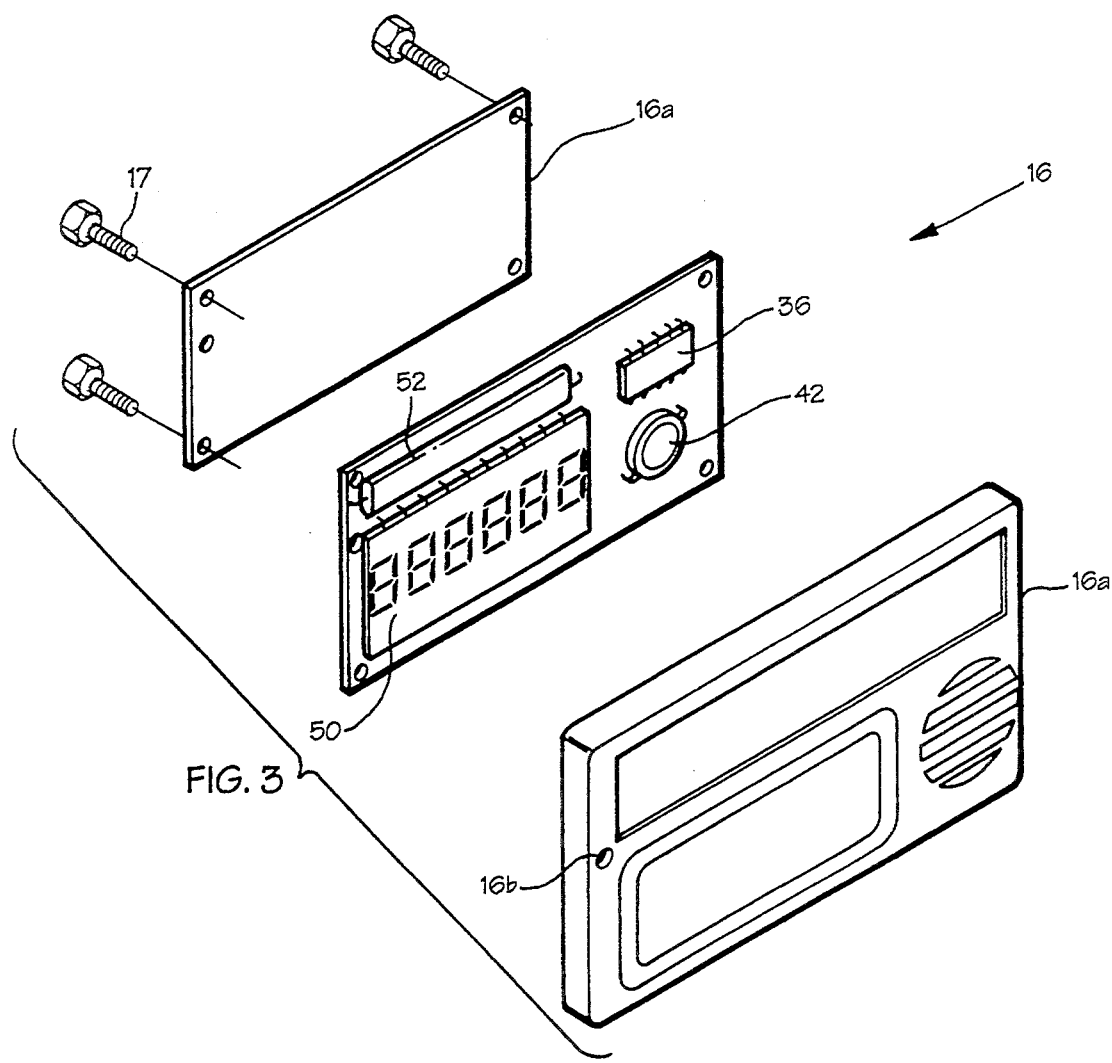
FIG. 3 is an exploded view of an embodiment of the display device.

As shown in FIG. 2 and FIG. 3, the display device 16 is an output unit for presenting a visual representation of data 26. The display device 16 has a memory 36 for storing data 26 to be displayed, and for storing an associated unique identifier 24. Preferably, the memory 36 is non-volatile. An ultrasonic transducer 38 and A-D/D-A converter 40 are provided as a means 42 for receiving an ultrasonically broadcast identifier and ultrasonically broadcast data. The transducer 38 preferably includes a piezoelectric transducer 38a for converting electrical signals into mechanical vibrations and, conversely, for converting vibrations into electrical signals. The display device 16 includes a comparator 44 for determining whether a received broadcast identifier matches the unique identifier stored in memory. A control logic unit 45 is provided which may be employed to verify the received data once the broadcast data has been received and converted to digital form, such as by performing a cyclic redundancy check (CRC) on the received data. Control logic unit 45 may be microprocessor controlled programmed logic or custom complementary metal-oxide semiconductor (CMOS) logic. Means 46 for ultrasonically generating an acknowledgment signal is provided, such as coupling the transducer 38 to a capacitor 48 which stores energy representative of a defined acknowledgement signal. The acknowledgement signal is preferably a short beep of a single known frequency tone emitted in a known time window after receipt of an identifier. Although a number of display mechanisms might be employed to display the received data, an LCD panel 50 is preferred on the basis of low power consumption and low cost. Similarly, the power source 52 for the display device is preferably solar/light power, via a solar/light cell, although a battery or other suitable power source might also be employed.

Figure 4:
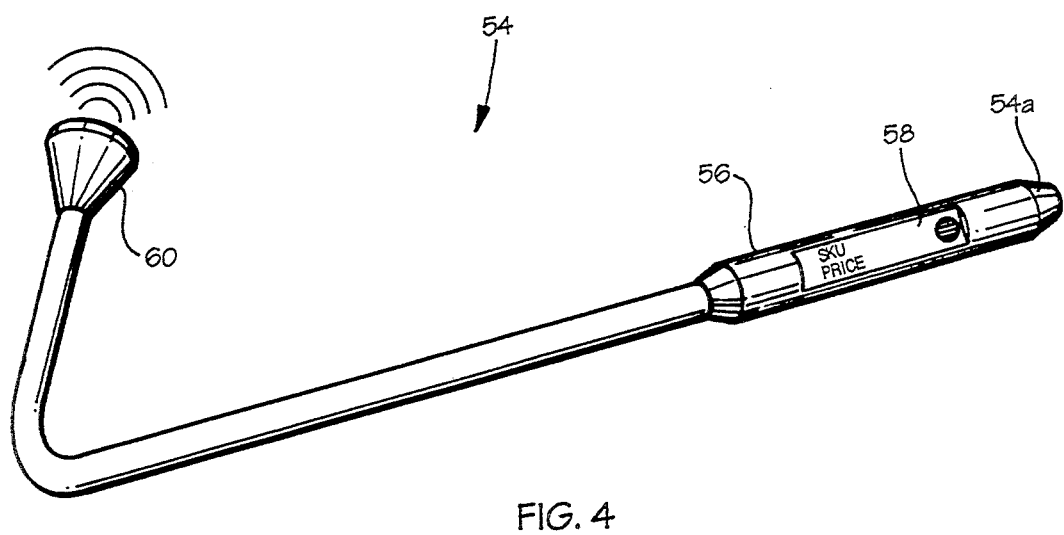
FIG. 4 is perspective view of means for locally loading the display device with an identifier and data.

The display device identifier 24 is preferably a number or other indicia which is stored in display device non-volatile memory 36. The identifier 24 may be chosen by the display device manufacturer as a type of serial number and loaded into memory 36 at the time of manufacture. Alternatively, as shown in FIG. 4, means 54 for locally loading the display device with an identifier and data may be provided. One embodiment of such a loading means 54 is an optical scanning wand 254a operably connected to an ultrasonic loading means transceiver 56. The optical scanning wand 54a is adapted for scanning indicia and communicating electronic signals representative of the indicia to the loading means transceiver 56, and may include a visual display 58, such as an LCD panel, for displaying the scanned indicia. The loading means transceiver 56 is fitted with an acoustic coupler 60 adapted for placement over the display device's receiving means 42. The acoustic coupler 60 acoustically isolates a display device 16. Electrical signals representative of the indicia are converted to analog form, ultrasonically transmitted to the display device receiving means 42 by the loading means transceiver 56, and appropriately stored in display device memory 36. Transmission of the information to the display device 16 is preceded by a special acoustic command to the display device 16 indicating that the information to follow is to be loaded as the unique identifier 24, as opposed to being processed as an identifier/data pair.

The ability to locally load display devices 16 with identifiers 24 facilitates a particularly advantageous encoding scheme. In those applications where the display devices 16 are intended to be associated with items having a Universal Product Code (UPC), the unique identifier 24 for a particular display device 16 may be encoded as the UPC for the associated item. A bar coded item may then be scanned for its UPC with the optical scanning wand 54a and an associated display device 16 immediately loaded with the UPC as the identifier 24.

The display device 16 may be advantageously encased in a water resistant case 16a for protective purposes, secured by affixing means such as screws 17. Further, the display device 16 may be adapted to fit onto the edge of a shelf, such as a grocery store shelf, by applying clamp, adhesive, or other affixing means to the display device 16. The display device 16 may also be adapted to attach to portable items, such as packaged foodstuffs, by providing a suitably placed opening 16b through a portion of the display device case 16a. The opening 16b thereby facilitates tagging of the display device 16 to a portable item.

Figure 5:
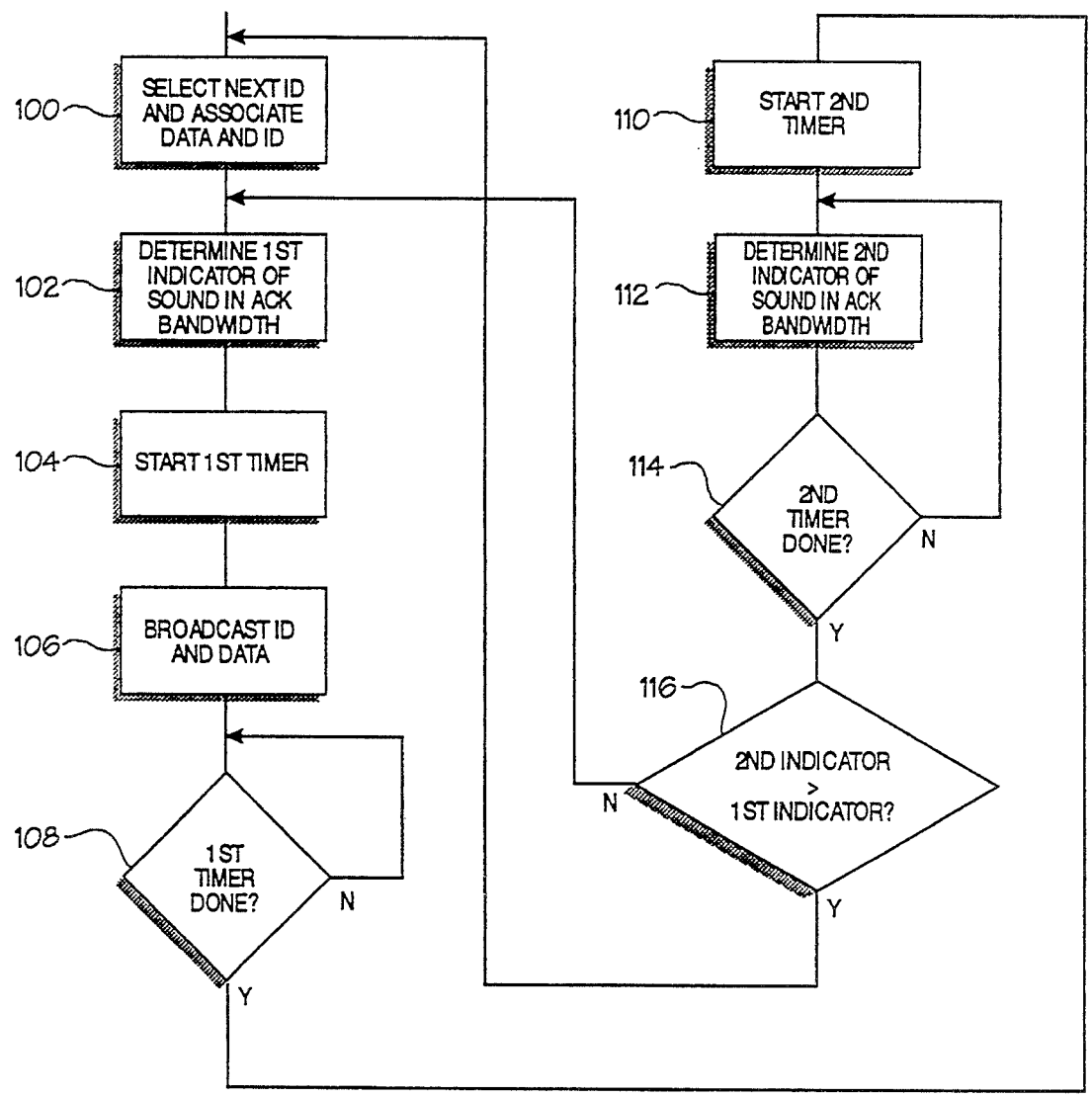
FIG. 5 is a flow diagram of an embodiment of the processor and the transceiver portion of the invented ultrasonic communication method.

In operation, as depicted in FIG. 5, the processor associates data intended to be displayed on a particular display device with the unique identifier for that particular display device, step 100. In practice, a database is constructed in which data intended to be displayed at each display device is paired with the unique identifier corresponding to the intended display device. In general, communication with the display devices proceeds by transmitting each identifier/data pair one at a time until all entries in the database have been processed.

Prior to the display device generating the acknowledgement signal, the processor, in combination with the transceiver, determines a first indicator of the amount of ambient sound within an acknowledgement signal bandwidth, step 102. A first timer may be employed to control the start of a second timer, steps 104 and 108. After the transceiver ultrasonically broadcasts the identifier and the associated data in step 106, the processor, in combination with the transceiver, determines a second indicator of the amount of ambient sound within the acknowledgment signal bandwidth, step 112, for a time period defined by steps 110 and 114.

More particularly, prior to transmitting the identifier/data pair, the processor evaluates in-band noise and uses this level (first indicator) as a baseline for comparing energy detected during a defined window of time in which an acknowledgement signal is expected (second indicator). The time window begins after the first timer has expired (or alternatively upon transmission of an identifier/data pair) and ends at some defined later time, typically on the order of a few milliseconds, but the window must be longer than that required to generate an acknowledgement signal. The time window must be long enough to allow for sonic propagation time variations resulting from varying distances between display devices and their associated transceiver.

In the process of communicating the identifier/data pair from the processor to the transceiver the information is converted from digital form to analog form. The transceiver then ultrasonically broadcasts the identifier and the associated data to any display devices within the broadcast area. The broadcast area is a function of the frequency range of the broadcast. Preferably, the identifier and associated data is ultrasonically broadcast within a range above human hearing but low enough to avoid excessive atmospheric attenuation (e.g., in the range of approximately 30,000 hertz to 50,000 hertz).

Signals detected by the transceiver during step 112 are communicated to the processor for processing and a determination of whether an acknowledgement signal has been received. An acknowledgment signal is determined to have been received if the processor determines that the second indicator exceeds the first indicator by a defined amount. The processor determines whether an acknowledgement signal has been received by performing digital signal processing on the signals detected by the transceiver.

The acknowledgement signal generated by a display device will be relatively weak and will buried in sonic and ultrasonic background detected by the transceiver. The energy in the acknowledgement signal, however, is advantageously chosen to be concentrated in a single tone. The background noise will be spread across the frequency spectrum. The amount of noise energy will therefore be low in the precisely defined band for the acknowledgement signal.

In order to detect an acknowledgement signal, the processor eliminates or filters noise energy not in the defined acknowledgement signal band. DSP may be employed to achieve filter bandwidths of one hertz or less, using simulated filter equivalent to 100 to 400 poles. A "pole" is the equivalent of a simple resistor-capacitor filter. The selectivity of the filter is a function of the amount of time devoted to processing, and processing time is a function of the amount of information to be analyzed.

Figure 6:
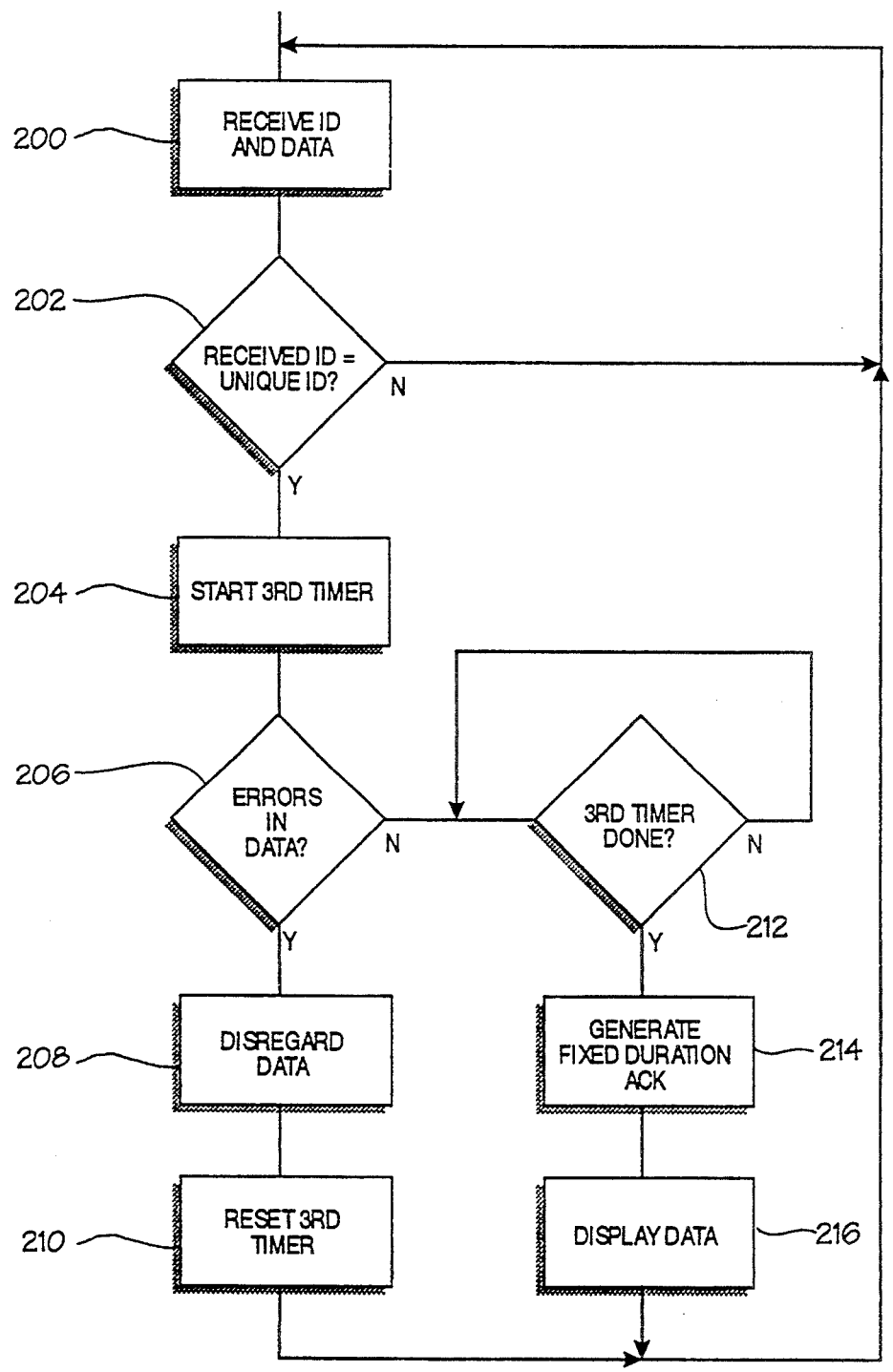
FIG. 6 is a flow diagram of an embodiment of the display device portion of the invented ultrasonic communication method.

As depicted in FIG. 6, the identifier and data is received at the display device, step 200. Each display device within the broadcast area "listens" for its identifier through its ultrasonic transducer. If a display device "hears" its unique identifier, that is, the broadcast identifier is determined to match the identifier stored in the memory of the display device, step 202, then the display device receives the associated data. Alternatively, a direct analog comparison of the received identifier and a stored analog form of the identifier could be made, but this is not preferred since it would require undesirable additional circuitry. Of course, the display device may receive the identifier/data pair in its entirety and a test then made to determine if the received identifier matches the unique identifier. In either case, if a match is determined, the received data, in acoustic form, is converted from analog to digital form and stored in memory in the display device. Preferably, once the broadcast data has been received and converted to digital form, the data is verified in step 206, for example, by performing a cyclic redundancy check (CRC) on the received data. The CRC may be performed in a well known manner, using known apparatii, such as microprocessor controlled programmed logic or custom complementary metal-oxide semiconductor (CMOS) logic. Once the display device receives the broadcast data, the display device generates a brief burst of a pure (single frequency) acoustic tone as an acknowledgement signal within a specified period or window of time, step 214. The specific frequency selected as an acknowledgement signal is a design choice, however the tone may be of relatively low amplitude because of the DSP to be done by the processor. Concurrent with generating the acknowledgement signal, or subsequent thereto, the display device displays the received data on the LCD panel, step 216.

Of course, many modifications and adaptations to the present invention could be made to advantage without departing from the spirit of this invention. The invention may be applied to communication systems other than ultrasonic communication systems. The invention may also be applied in settings other than retail consumer transactions. Communication between the processor and the transceiver may be direct-connect electronic communication or remote communication via radio, light, or acoustic transmission. Analog-to-digital and digital-to-analog conversions could be replaced with equivalent direct analog computations. Further some features of the present invention could be used without corresponding use of other features. The display device need not be limited to use as a shelf label or item label, for example. Accordingly, this description should be considered as merely illustrative of the principles of the present invention and not in limitation thereof.

We claim:

1. Ultrasonic communication method between means for processing data, means for transceiving ultrasonic signals, and means for displaying data, wherein each displaying means has a unique identifier, comprising the steps of:
   (a) associating data with an identifier at said processing means;
   (b) communicating the identifier and the associated data to said transceiving means;
   (c) ultrasonically broadcasting the identifier and the associated data at said transceiving means;
   (d) receiving the broadcast identifier and the associated data at said displaying means;
   (e) ultrasonically generating an acknowledgment signal at said displaying means if the received identifier matches the unique identifier of said displaying means;
   (f) displaying the received data at said displaying means; and
   (g) determining at said processing means whether the acknowledgment signal was generated, wherein step (g) includes
   (i) prior to step (d), determining a first indicator of the amount of sound within an acknowledgment signal bandwidth;
   (ii) for a time window after step (c), determining a second indicator of the amount of sound within the acknowledgment signal bandwidth; and
   (iii) determining the acknowledgment signal to have been generated if the second indicator exceeds the first indicator by a defined amount.

2. Ultrasonic communication method according to claim 1, wherein step (c) includes ultrasonically broadcasting the data and the identifier within a range of 30,000 hertz to 50,000 hertz.

3. Ultrasonic communication method according to claim 1, further comprising the step of verifying the data after the data has been received at step (d).

4. Ultrasonic communication method according to claim 3, wherein the verifying step includes performing a cyclic redundancy check on the received data.

5. Ultrasonic communication method according to claim 1, wherein step (g) is performed by employing digital signal processing.

6. Ultrasonic communication method according to claim 1, wherein step (g) is performed by employing analog filters.

7. Communication method between means for processing data, means for transceiving signals, and means for displaying data, wherein each displaying means has a unique identifier, comprising the steps of:
   (a) associating data with an identifier at said processing means;
   (b) communicating the identifier and the associated data to said transceiving means;
   (c) broadcasting the identifier and the associated data at said transceiving means;
   (d) receiving the broadcast identifier and the associated data at said displaying means;
   (e) generating an acknowledgment signal, within a narrow acknowledgement signal bandwidth, at said displaying means if the received identifier matches the unique identifier of said displaying means;
   (f) displaying the received data at said displaying means; and
   (g) prior to step (d), determining a first indicator of the amount of signal frequency within an acknowledgment signal bandwidth;

(h) for a time window after step (c), determining a second indicator of the amount of signal frequency within the acknowledgment signal bandwidth; and (i) determining the acknowledgment signal to have been generated if the second indicator exceeds the first indicator by a defined amount.

8. Ultrasonic communication display apparatus, comprising:

(a) means for associating a unique identifier with the apparatus;

(b) means for determining a first indicator of the amount of sound within an acknowledgment signal bandwidth;

(c) means for receiving an ultrasonically broadcast identifier and ultrasonically broadcast data;

(d) means for determining a second indicator of the amount of sound within the acknowledgment signal bandwidth for a time window after an ultrasonically broadcast identifier and ultrasonically broadcast data;

(e) means for determining whether a received broadcast identifier matches the unique identifier;

(f) means for ultrasonically generating an acknowledgment signal;

(g) means for displaying received data; and (h) means for determining the acknowledgment signal to have been generated if the second indicator exceeds the first indicator by a defined amount.

9. Ultrasonic communication display apparatus according to claim 8, wherein said associating means is a memory in which said identifier is stored.

10. Ultrasonic communication display apparatus according to claim 8, wherein said identifier is a UPC.

11. Ultrasonic communication display apparatus according to claim 8, wherein said receiving means and said generating means both employ a piezoelectric transducer.

12. Ultrasonic communication display apparatus according to claim 8, wherein said determining means includes a comparator for comparing whether a received broadcast identifier matches the unique identifier associated with the apparatus.

13. Ultrasonic communication display apparatus according to claim 8, wherein said displaying means includes a liquid crystal display panel.

14. Ultrasonic communication display apparatus according to claim 8, further comprising means for affixing the apparatus to a shelf edge.

15. Ultrasonic communication display apparatus according to claim 8, further comprising means for affixing the apparatus to a portable item.

16. Ultrasonic communication system, comprising:

(a) means for processing data, including
  (i) means for associating data with an identifier;
  (ii) means for detecting an acknowledgment signal, including
    (1) means for determining a first indicator of the amount of sound within an acknowledgment signal bandwidth;
    (2) means for determining a second indicator of the amount of sound within the acknowledgment signal bandwidth for a time window after an ultrasonically broadcast identifier and ultrasonically broadcast data;
    (3) means for determining the acknowledgment signal to have been generated if the second indicator exceeds the first indicator by a defined amount;

(b) means for transceiving ultrasonic signals, operably coupled to said processing means for communication therewith, including means for ultrasonically broadcasting an identifier and associated data, and means for receiving ultrasonic signals;

(c) means for displaying data, the displaying means having a unique identifier, including
  (i) means for receiving an ultrasonically broadcast identifier and ultrasonically broadcast data;
  (ii) means for determining whether a received broadcast identifier matches the unique identifier;
  (iii) means for ultrasonically generating an acknowledgment signal; and
  (iv) means for displaying received data.

17. Ultrasonic communication system according to claim 16, further comprising means for loading said data displaying means with said identifier and associated data, comprising:

(a) means for optically scanning indicia;

(b) means for transceiving ultrasonic signals;

(c) first coupling means for communicating signals representative of said indicia from said scanning means to said transceiving means; and (d) second coupling means for communicating signals representative of said indicia from said transceiving means to said display device.

18. Loading apparatus according to claim 17, wherein said scanning means is an optical scanning wand.

19. Loading apparatus according to claim 17, wherein said second coupling means is an acoustic coupler for placement over a receiving means of said display device.

20. Loading apparatus according to claim 17, further comprising means for displaying scanned indicia.

* * * * *